(12) United States Patent
Kim

(10) Patent No.: US 9,060,116 B2
(45) Date of Patent: Jun. 16, 2015

(54) SURVEILLANCE SYSTEM

(75) Inventor: Hak-Je Kim, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 433 days.

(21) Appl. No.: 13/477,463

(22) Filed: May 22, 2012

(65) Prior Publication Data

US 2012/0300081 A1 Nov. 29, 2012

(30) Foreign Application Priority Data

May 24, 2011 (KR) ........................ 10-2011-0049014

(51) Int. Cl.
*H04N 5/232* (2006.01)
*G08B 13/196* (2006.01)

(52) U.S. Cl.
CPC ...... *H04N 5/23206* (2013.01); *G08B 13/19656* (2013.01); *G08B 13/19669* (2013.01); *G08B 13/19671* (2013.01)

(58) Field of Classification Search
None
See application file for complete search history.

(56) References Cited

U.S. PATENT DOCUMENTS

| | | | | |
|---|---|---|---|---|
| 7,876,357 B2* | 1/2011 | Jung et al. | ................. | 348/207.1 |
| 2002/0056126 A1* | 5/2002 | Srikantan et al. | ............... | 725/87 |
| 2003/0156203 A1* | 8/2003 | Kondo et al. | ............... | 348/222.1 |
| 2005/0144302 A1* | 6/2005 | Kirkpatrick et al. | .......... | 709/231 |
| 2006/0184553 A1* | 8/2006 | Liu et al. | ....................... | 707/101 |
| 2007/0103565 A1* | 5/2007 | Xu et al. | ..................... | 348/231.3 |
| 2009/0208054 A1* | 8/2009 | Angell et al. | ................. | 382/103 |
| 2009/0316955 A1* | 12/2009 | Takeuchi | ...................... | 382/103 |
| 2010/0062835 A1* | 3/2010 | Hoplions | ........................ | 463/25 |
| 2010/0085443 A1* | 4/2010 | Maeda et al. | ............... | 348/231.2 |
| 2011/0047341 A1* | 2/2011 | Yu et al. | ....................... | 711/162 |
| 2011/0050901 A1* | 3/2011 | Oya | ............................ | 348/143 |
| 2011/0102588 A1* | 5/2011 | Trundle et al. | ................ | 348/143 |
| 2011/0129120 A1* | 6/2011 | Chan | .............................. | 382/103 |
| 2012/0169882 A1* | 7/2012 | Millar et al. | .................. | 348/159 |

FOREIGN PATENT DOCUMENTS

| | | |
|---|---|---|
| KR | 1020030064689 A | 8/2003 |
| KR | 1020040102612 A | 12/2004 |
| KR | 10-2005-0112998 A | 12/2005 |
| KR | 10-2007-0005247 A | 1/2007 |
| KR | 10-0899666 B1 | 5/2009 |

\* cited by examiner

*Primary Examiner* — Sath V Perungavoor
*Assistant Examiner* — Janese Duley
(74) *Attorney, Agent, or Firm* — Sughrue Mion, PLLC

(57) ABSTRACT

Provided is a surveillance system including a plurality of network cameras; and at least one server connected to the network cameras via a communication network, wherein each of the network cameras captures and stores video data, extracts metadata, which is a basis of event data, from the video data, transmits the metadata to the server, and wherein, if requested by the server, each of the network cameras transmits the stored video data to the server.

5 Claims, 13 Drawing Sheets

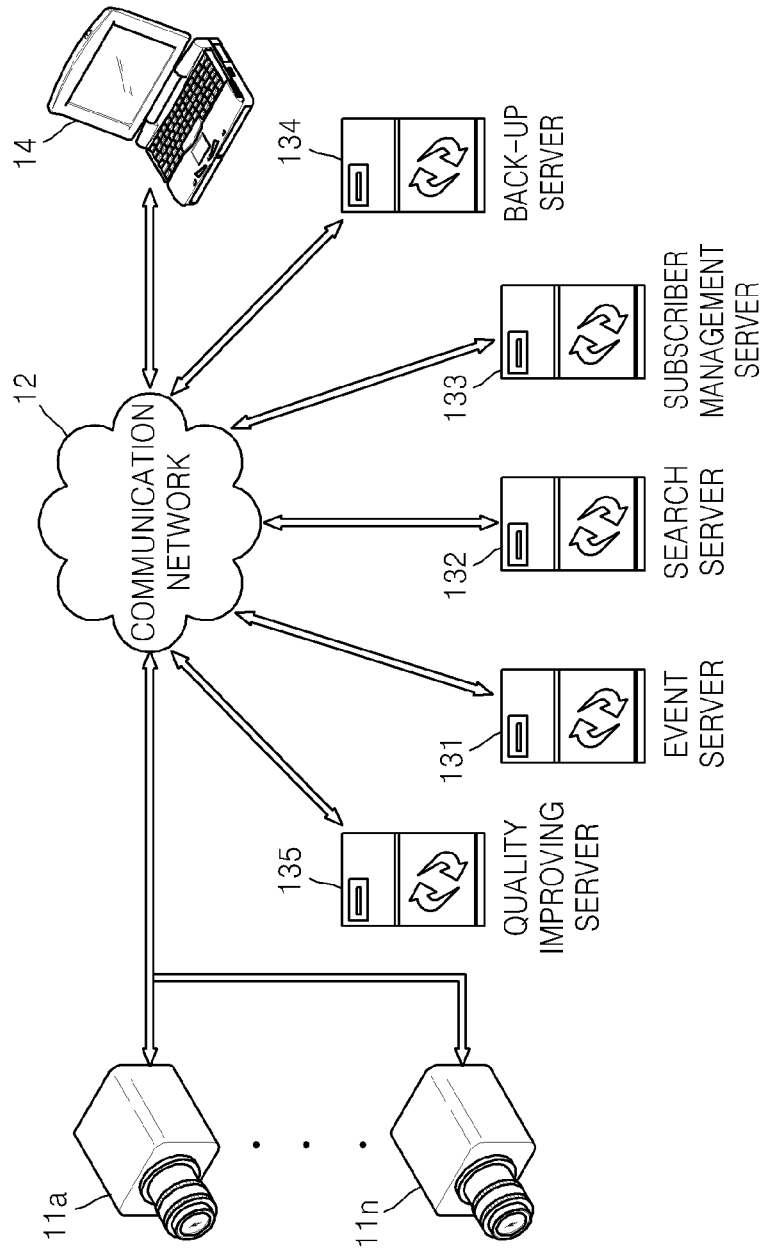

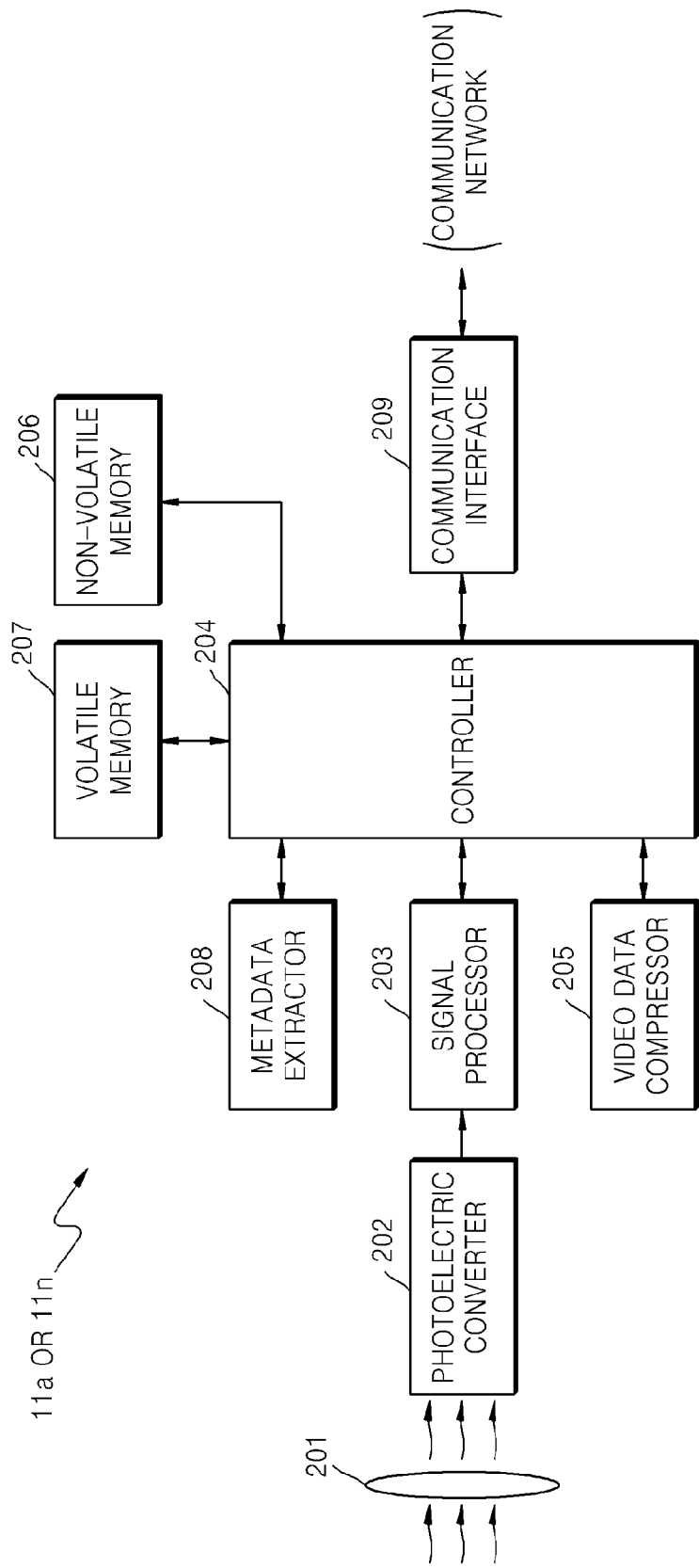

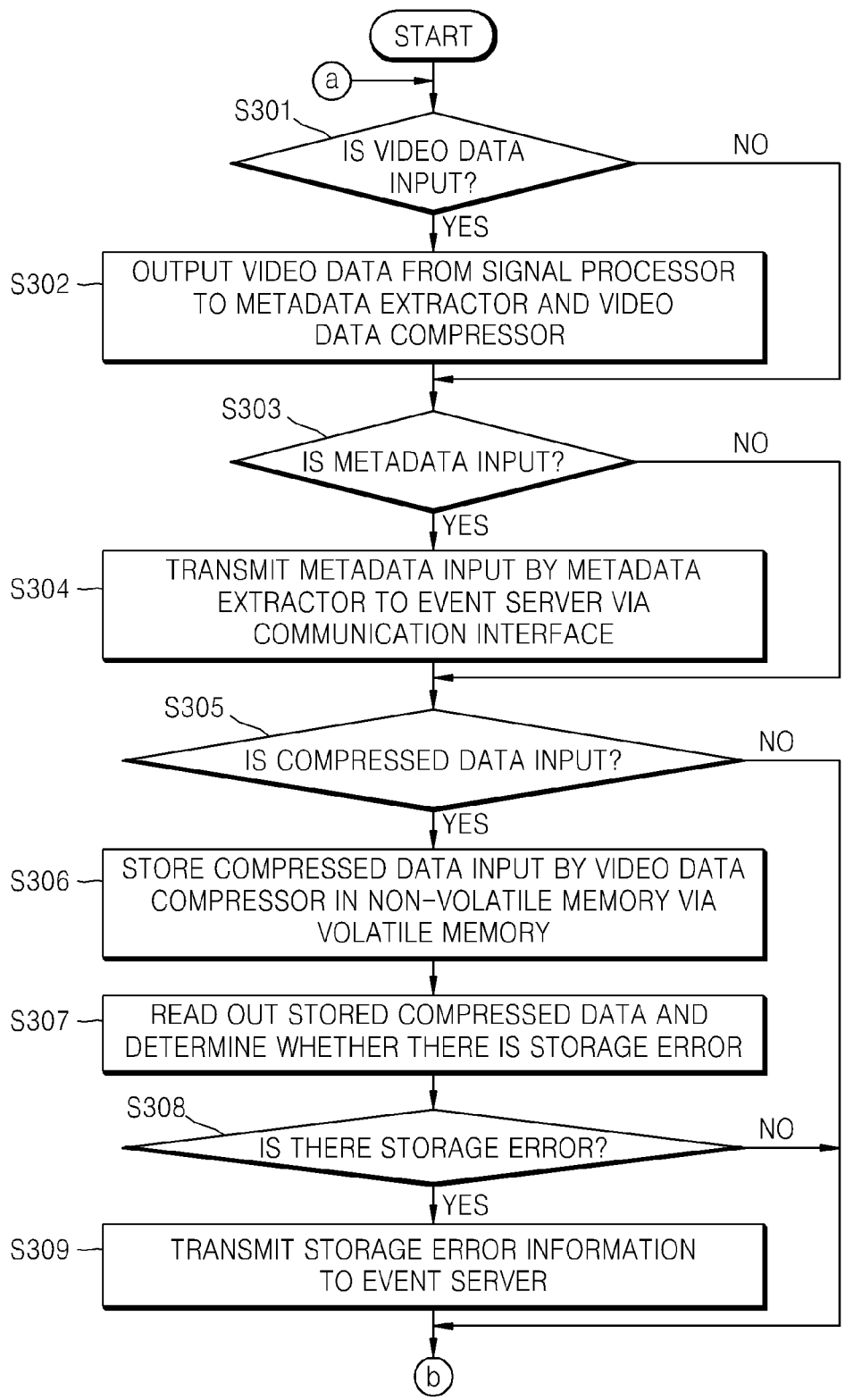

FIG. 10
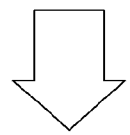
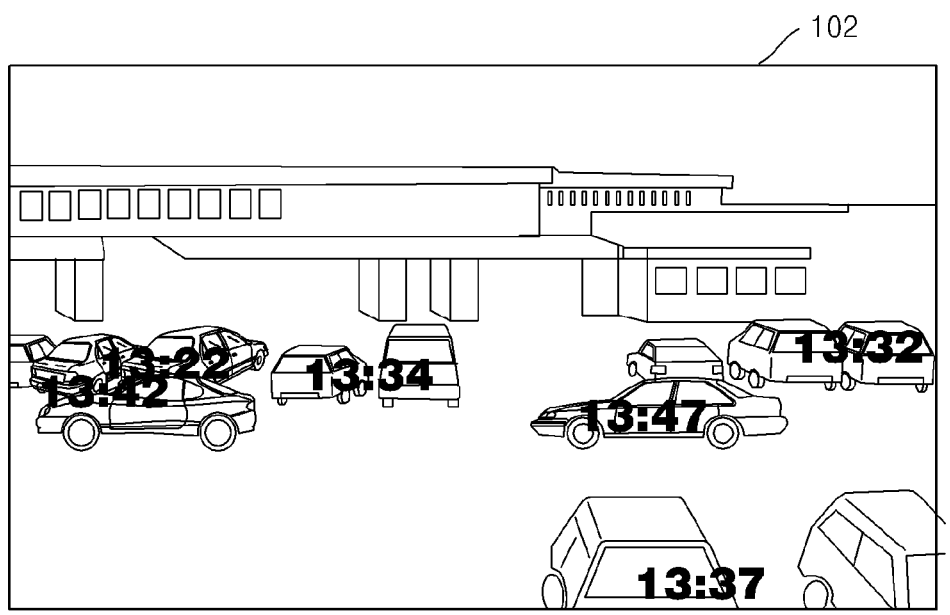

SURVEILLANCE SYSTEM

CROSS-REFERENCE TO RELATED PATENT APPLICATION

This application claims priority from Korean Patent Application No. 10-2011-0049014, filed on May 24, 2011, in the Korean Intellectual Property Office, the disclosures of which are incorporated herein in its entirety by reference.

BACKGROUND

1. Field

Apparatuses consistent with exemplary embodiments relate to a surveillance system, and more particularly, to a surveillance system in which network cameras and a server are interconnected via a communication network.

2. Description of the Related Art

In a surveillance system in the related art, network cameras and a server are interconnected via a communication network.

In such a surveillance system, compressed video data from network cameras is transmitted to a server and subscribers via a communication network. Hereinafter, the term "subscribers" refers to personal computers (PCs) or wireless terminals, such as smart phones, of subscribed users.

In the surveillance system, since compressed video data from a plurality of network cameras is simultaneously transmitted to the server and the subscribers, a massive amount of video data is transmitted via the communication network. For example, if it is necessary to transmit compressed video data from an arbitrary network camera at a transmission rate of several megabits per second (Mbps), a transmission rate of dozens of Mbps is required for 10 network cameras to transmit compressed video data. The transmission rate increases when a large number of network cameras are required or high-quality video is required.

Therefore, a surveillance system in the related art has the problems below due to transmission of a massive amount of data.

First, communication errors frequently occur during transmission of video data, and thus, the reliability of a surveillance function is low.

Second, a massive amount of video data from a plurality of channels is stored in a server, e.g., a network video recorder (NVR), and thus, a relatively long time is required to search for video of a particular channel or interest according to a user request.

Third, due to the first and second problems, that is, the low reliability of a surveillance function and a relatively long time for searching for video, it is difficult to provide various services related to a surveillance function to subscribers.

SUMMARY

One or more exemplary embodiments provide a surveillance system which features improved reliability of a surveillance function and enables fast searching for a video, so as to provide various services related to a surveillance function to subscribers.

Additional aspects will be set forth in part in the description which follows and, in part, will be apparent from the description, or may be learned by practice of the presented exemplary embodiments.

According to one or more exemplary embodiments, in a surveillance system, network cameras and at least one server are interconnected via a communication network, wherein each of the network cameras captures and stores video data, extracts metadata, which is a basis of event data, from the video data, transmits the metadata to the server, and, if requested by a server, transmits the stored video data to the server.

The at least one server includes a subscriber management server; an event server; and a search server.

The subscriber management server is arranged to manage subscriber information about a subscriber and provide a service requested by the subscriber to the subscriber.

The event server acquires event data by using the metadata received from the network cameras and stores the event data.

The search server searches for subscriber-specific event data in the event data stored in the event server according to at least one of the subscriber information and service information from the subscriber management server and receives video data by communicating with at least one of the network cameras corresponding to the subscriber-specific event data Each of the network cameras includes an optical component; a photoelectric converter; a signal processor; a controller; a metadata extractor; a video data compressor; a non-volatile memory; a volatile memory; and a communication interface.

The photoelectric converter converts light incident via the optical component to electric signals.

The signal processor generates the video data by processing the electric signals from the photoelectric converter.

The controller receives the video data from the signal processor and controls the network camera.

The metadata extractor extracts the metadata from the video data from the controller and inputs the metadata to the controller.

The video data compressor compresses the video data from the controller and inputs the compressed video data to the controller.

The non-volatile memory stores programs for operating the controller and the compressed video data from the controller.

The volatile memory loads the programs for operating the controller and buffers the compressed video data from the controller.

The communication interface supports communication between the controller and the event server and communication between the controller and the search server.

After the compressed video data is stored in the non-volatile memory, the controller may determine whether there is a storage error by reading the stored compressed video data, and, if it is determined that a storage error occurs, the controller may transmit storage error information to the event server.

When the event server stores the event data, the event data may be stored together with information regarding the subscriber which requests a service related to the event data, information regarding at least one of the cameras which transmits the metadata used to acquire the event data, and video information indicating a location at which video data corresponding to the metadata is stored.

When the subscriber requests a real-time event service, the subscriber management server may transmit the at least one of the subscriber information and the service information to the event server.

If the subscriber requests a summarized video service related to the event data, the subscriber management server transmits the at least one of the subscriber information and the service information to the search server. Here, the search server may search for the subscriber-specific event data from among event data stored in the event server, receive the video data by communicating with the at least one of the plurality of network cameras corresponding to the subscriber-specific event data, analyze the video data with reference to the subscriber-specific event data, extract the summarized video data according to a result of the analysis, and transmit the extracted summarized video data to the subscriber or an address which the subscriber designates.

If the subscriber requests a face video service related to the event data, the subscriber management server may transmit the at least one of the subscriber information and the service information to the search server, search for the subscriber-specific event data from among the event data stored in the event server, receive the video data by communicating with the at least one of the plurality of network cameras corresponding to the subscriber-specific event data, generate face video data by using portions of the received video data containing face videos, and transmit the generated face video data to the subscriber or the address which the subscriber designates.

The surveillance system may further include a quality improving server; and a back-up server. The quality improving server processes the video data received from the search server to improve video quality. The back-up server stores a backup of the video data received from the search server.

If the subscriber requests a video back-up service related to the event data, the subscriber management server may transmit the at least one of the subscriber information and the service information to the search server, search for the subscriber-specific event data from among the event data stored in the event server, receive the video data by communicating with the at least one of the plurality of network cameras corresponding to the subscriber-specific event data, and transmit the received video data to the back-up server.

If the subscriber requests a quality improvement service related to the event data, the subscriber management server may transmit the at least one of the subscriber information and the service information to the search server, search for the subscriber-specific event data from among the event data stored in the event server, receive the video data by communicating with the at least one of the plurality of network cameras corresponding to the subscriber-specific event data, and transmit the received video data to the quality improving server.

BRIEF DESCRIPTION OF THE DRAWINGS

The above and other aspects will become more apparent by describing in detail exemplary embodiments thereof with reference to the attached drawings, in which:

FIG. 1 is a diagram showing a surveillance system according to an exemplary embodiment;

FIG. 2 shows the internal configuration of each of network cameras of FIG. 1, according to an exemplary embodiment;

FIGS. 3A and 3B are a flowchart for describing operation of a controller of FIG. 2, according to an exemplary embodiment;

FIG. 10 an image for describing another example of the additional analysis in FIG. 8, according to an exemplary embodiment;

DETAILED DESCRIPTION OF THE EXEMPLARY EMBODIMENTS

Figure 3B:
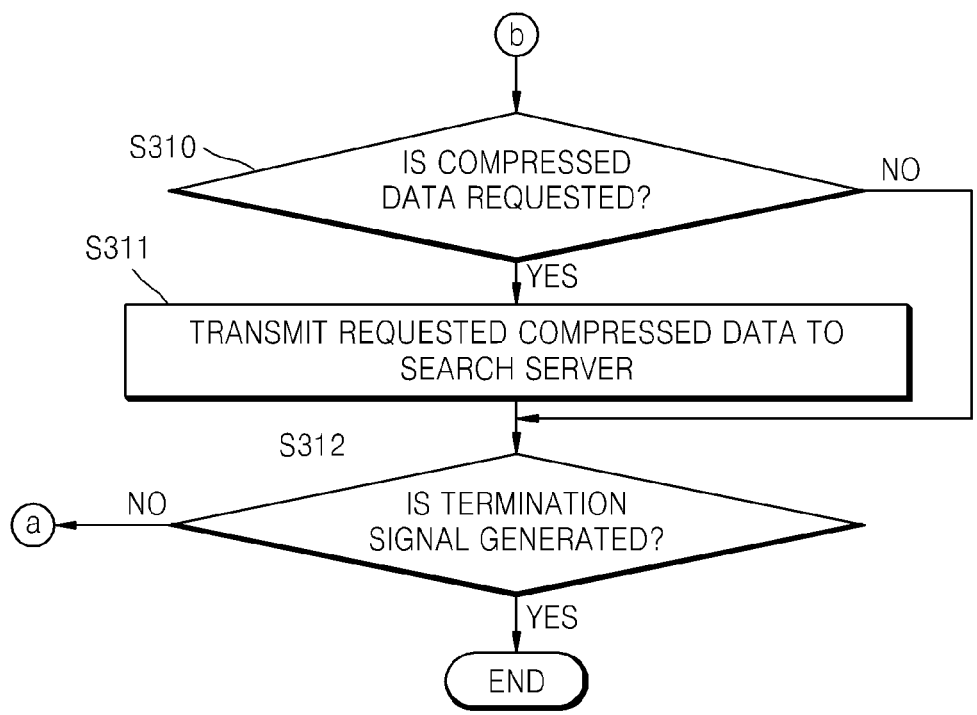

The inventive concept will now be described more fully with reference to the accompanying drawings, in which exemplary embodiments of the invention are shown. The inventive concept may, however, be embodied in many different forms and should not be construed as being limited to the exemplary embodiments set forth herein.

FIG. 1 is a diagram showing a surveillance system according to an exemplary embodiment.

Referring to FIG. 1, in the surveillance system according to the present embodiment, network cameras 11a through 11n and servers 131 through 135 are interconnected via a communication network 12.

Here, each of the network cameras 11a through 11n captures and stores video data, extracts metadata, which is a basis of event data, from the video data, transmits the metadata to an event server 131 from among the servers 131 through 135, and, if requested by a search server 132 from among the servers 131 through 135, transmits the stored video data to the search server 132.

Therefore, it is not necessary for video data captured by all of the network cameras 11a through 11n to be transmitted to the servers 131 through 135.

Therefore, if a large number of network cameras 11a through 11n are required or higher quality video is required, an amount of data to be transmitted to the servers 131 through 135 may be significantly reduced. As a result, the following effects may be expected:

First, communication errors during data transmission may be significantly reduced, and thus, the reliability of a surveillance function may be improved.

Second, since event data, which is significantly smaller than video data, is stored in the event server 131, event data corresponding to a particular channel may be quickly searched for according to a user request, and related video or video data may be quickly received from one the network cameras 11a through 11n corresponding to the searched event data.

Third, due to the first and second effects, that is, the high reliability of a surveillance function and a relatively short time for searching for video of a particular channel or interest, various services related to a surveillance function may be provided to subscribers.

In detail, the servers 131 through 135 include a subscriber management server 133, the event server 131, and the search server 132.

The subscriber management server 133 is arranged to manage subscriber information and to provide a service or services requested by a subscriber 14 to the subscriber 14. Here, the subscriber 14 refers to a personal computer (PC) or a wireless terminal, such as a smart phone, of a subscribed user.

The event server 131 acquires event data by using metadata received from the network cameras 11a through 11n, and stores the event data. As known in the art, the metadata is a basis of event data. Examples of the metadata and the event data will be described later with reference to FIG. 6.

The search server 132 searches for subscriber-specific event data from among the event data stored in the event server 131 according to at least one of subscriber information and service information received from the subscriber management server 133, and receives video data by communicating with at least one of the network cameras 11a through 11n corresponding to the subscriber-specific event data. The search server 132 may also receive video data corresponding to the subscriber-specific event data by communicating with at least one of the network cameras 11a through 11n. Instead of the subscriber-specific event data, the search server 132 may simply search for metadata corresponding to at least one of the subscriber information and the service information, and receives video data corresponding to the searched-for metadata by communicating with at least one of the network cameras 11a through 11n.

According to the present embodiment, the servers 131 through 135 further include a quality improving server 135 and a back-up server 134 for providing more various services to the subscriber 14.

The quality improving server 135 processes video data received from the search server 132 to improve video quality. As known in the art, the quality improvement may include motion-blur improvement, increased resolution, etc.

The back-up server 134 stores a backup of video data received from the search server 132.

FIG. 2 shows the internal configuration of each of the network cameras 11a through 11n of FIG. 1, according to an exemplary embodiment. Referring to FIG. 2, each of the network cameras 11a through 11n may include an optical component 201, a photoelectric converter 202, a signal processor 203, a controller 204, a metadata extractor 208, a video data compressor 205, a non-volatile memory 206, a volatile memory 207, and a communication interface 209.

As known in the art, the optical component 201 includes lenses and filters.

The photoelectric converter 202, which includes either a charge-coupled device (CCD) or a complementary metal-oxide semiconductor (CMOS) image sensor, converts light incident via the optics 201 to electric signals.

The signal processor 203 generates digital video data by processing electric signals from the photoelectric converter 202.

The controller 204 receives video data from the signal processor 203 and controls the overall operation of the network camera.

The metadata extractor 208 extracts metadata, which is the basis of event data, from the video data received from the controller 204 and inputs the metadata to the controller 204.

The video data compressor 205 compresses the video data from the controller 204 and inputs the compressed video data to the control unit 204.

The non-volatile memory 206 stores programs for operating the controller 204 and the compressed video data from the controller 204. Here, if a solid state disk (SSD), which has been recently developed, is used as the non-volatile memory 206, a large amount of data may be stored in a small device. In other words, compressed video data may be cumulatively stored. The programs for operating the controller 204 which are stored in the non-volatile memory 206 include an operating system (OS) including device drivers and application programs.

The volatile memory 207 loads the programs for operating the controller 204 and buffers the compressed video data from the controller 204.

The communication interface 209 supports communication between the controller 204 and the event server 131 (see FIG. 1). and communication between the controller 204 and the search server 132 (see FIG. 1).

FIGS. 3A and 3B are a flowchart for describing operations of the controller 204 of FIG. 2, according to an exemplary embodiment. Referring to FIGS. 2, 3A and 3B, operations of the controller 204 are described as below.

When video data is input by the signal processor 203 (operation S301), the controller 204 outputs the video data from the signal processor 203 to the metadata extractor 208 and the video data compressor 205 (operation S302).

When metadata is input to the controller 204 by the metadata extractor 208 (operation S303), the controller 204 transmits the metadata input by the metadata extractor 208 to the event server 131 (see FIG. 1) via the communication interface 209 (operation S304).

When compressed video data is input by the video data compressor 205 (operation S305), the controller 204 stores the compressed video data input by the video data compressor 205 in the non-volatile memory 206 via the volatile memory 207 (operation S306).

The controller 204 determines whether there is a storage error by reading the stored compressed video data (operation S307). Here, if a storage error occurs due to a problem of the non-volatile memory 206, for example (operation S308), the controller 204 transmits storage error information to the event server 131 (operation S309). Accordingly, the event server 131 outputs an alarm signal and the storage error information, so that an administrator of a surveillance system may check and repair or replace the non-volatile memory 206 of a corresponding one of the plurality of network cameras 11a through 11n.

When the search server 132 (see FIG. 1) requests video data from the controller 204 via the communication network 12 and the communication interface 209 (operation S310), the controller 204 transmits the requested video data to the search server 132 (operation S311). The video data transmitted to the search server 132 may be video data compressed by the video data compressor 205. The video data transmitted to the search server 132 may also be compressed video data stored in the non-volatile memory 206 or the volatile memory 207.

The above operations are repeatedly performed until a termination signal is generated (operation S312). In the above, operations 302 through 307 are described as being sequentially performed. However, the inventive concept is not limited to such sequential performance of these operations. Operations 303 and 304 may be performed before operations 305, 306 and 307, or performed independently from operations 305, 306 and 307.

Figure 4A:
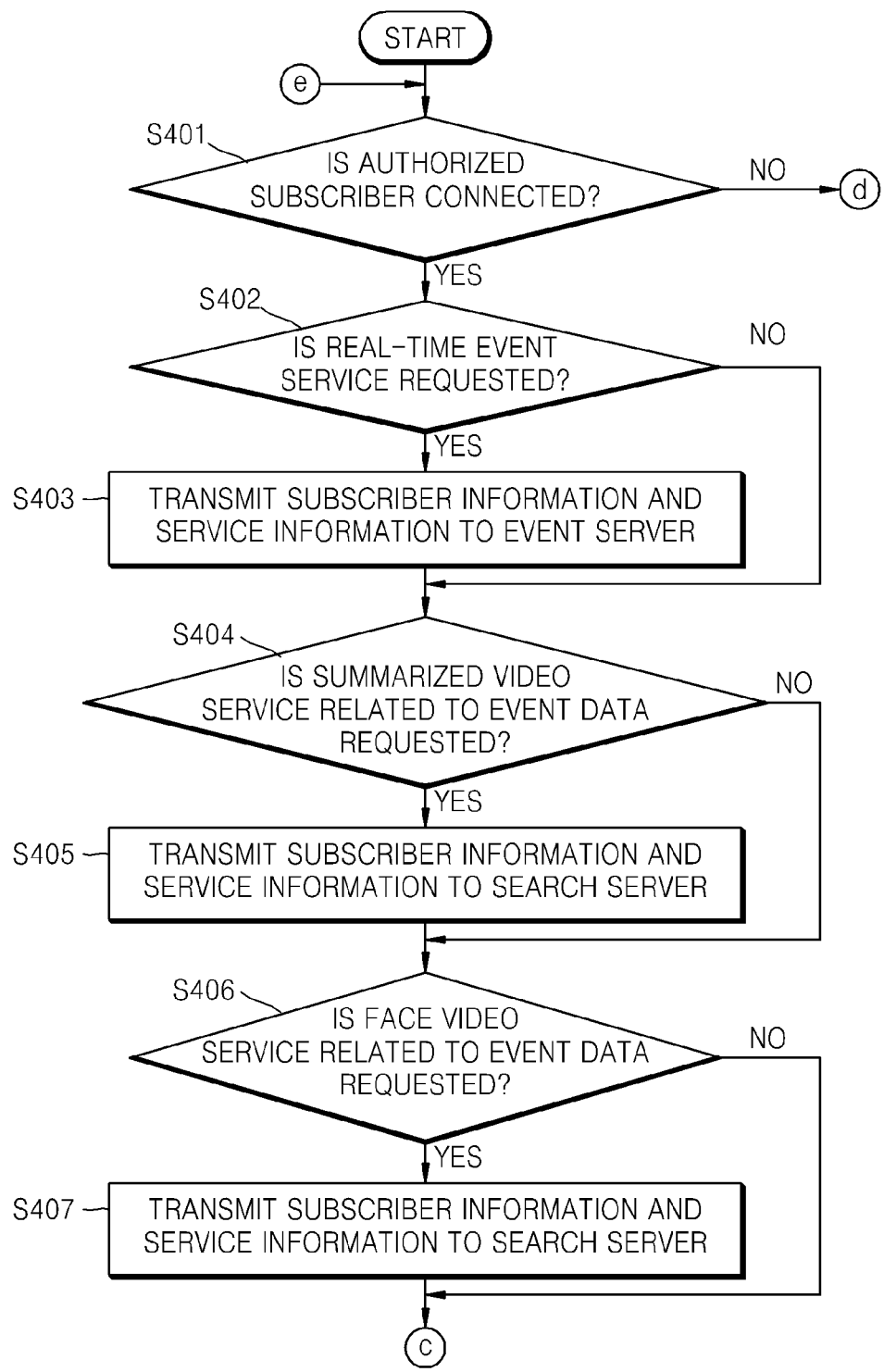
FIGS. 4A and 4B are a flowchart for describing operation of a subscriber management server of FIG. 1, according to an exemplary embodiment.
Figure 4B:
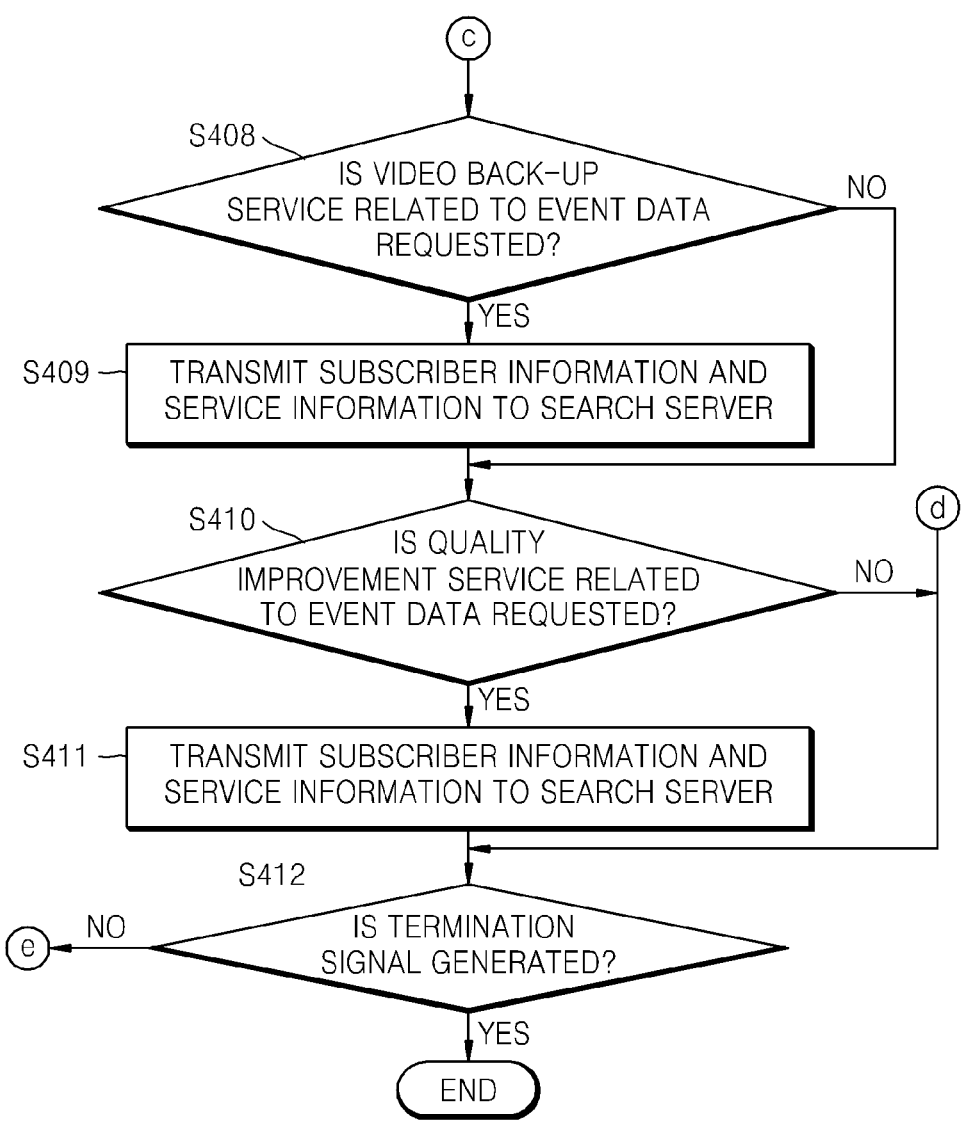

FIGS. 4A and 4B are a flowchart for describing operations of the subscriber management server 133 of FIG. 1, according to an exemplary embodiment. Referring to FIGS. 1, 4A and 4B, the operations of the subscriber management server 133 are described as below.

The authorized subscriber 14 is connected to the subscriber management server 133 via the communication network 12 (operation S401). As described above, the subscriber 14 refers to a PC or a wireless terminal, such as a smart phone, of a subscribed user.

When the connected subscriber 14 requests a real-time event service (operation S402), the subscriber management server 133 transmits subscriber information and service information to the event server 131 (operation S403).

When the connected subscriber 14 requests a summarized video service related to event data (operation S404), the subscriber management server 133 transmits subscriber information and service information to the search server 132 (operation S405).

When the connected subscriber 14 requests a face video service related to event data (operation S406), the subscriber management server 133 transmits subscriber information and service information to the search server 132 (operation S407).

When the connected subscriber 14 requests video back-up service related to event data (operation S408), the subscriber management server 133 transmits subscriber information and service information to the search server 132 (operation S409).

When the connected subscriber 14 requests quality improvement service related to event data (operation S410), the subscriber management server 133 transmits subscriber information and service information to the search server 132 (operation S411).

All of the above operations are repeatedly performed until a termination signal is generated (operation S412). In the above, operations 402 through 411 are described as being sequentially performed. However, the inventive concept is not limited to such sequential performance of these operations. Any sequential combinations of operations 402 and 403, operations 404 and 405, operations 406 and 407, operations 408 and 409, and operations 410 and 411 may be possible as different exemplary embodiments. For example, operations 404 and 405 may be performed before operations 402 and 403. Also, each of operations 402 and 403, operations 404 and 405, operations 406 and 407, operations 408 and 409, and operations 410 and 411 may be performed independently from the other operations.

Figure 5:
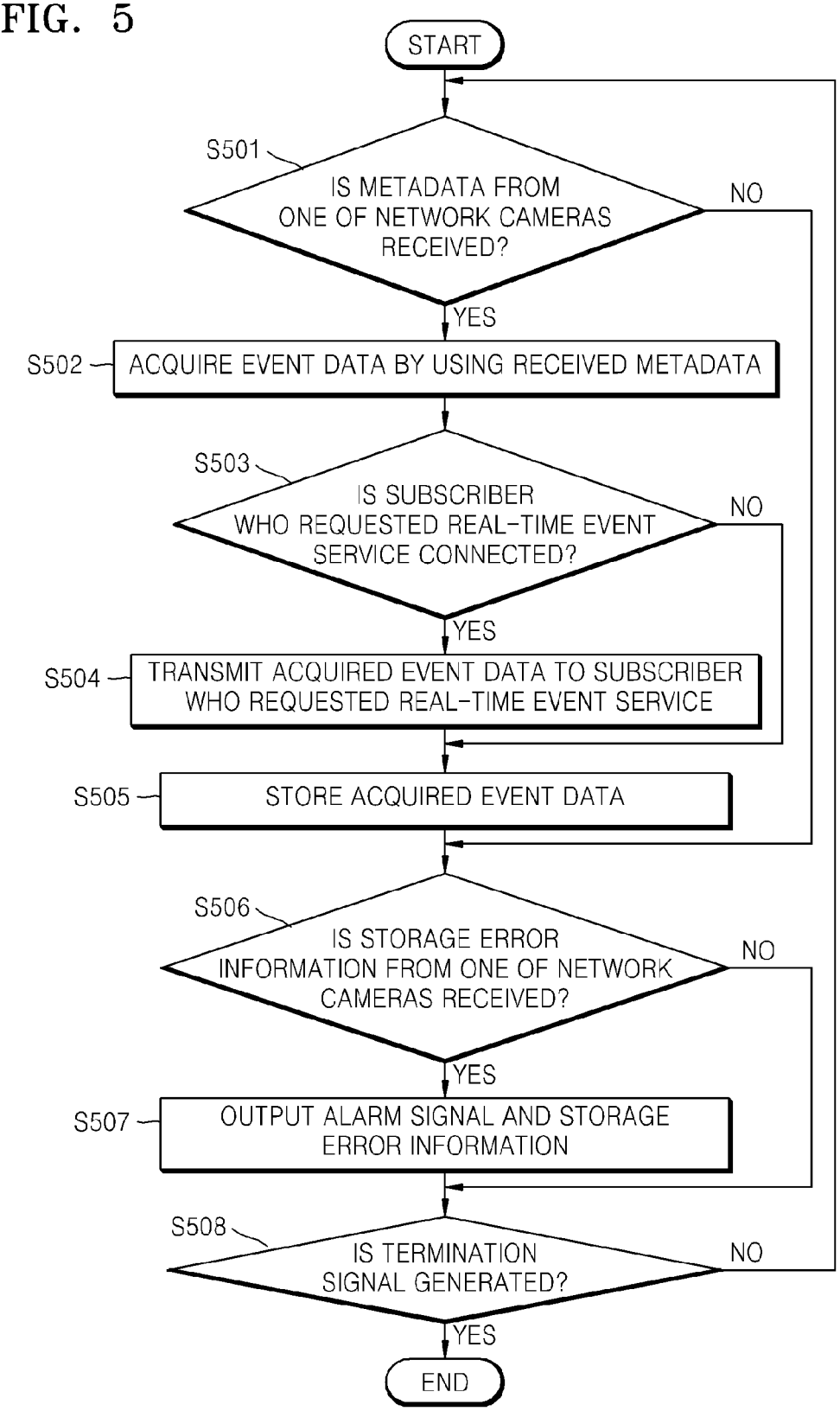
FIG. 5 is a flowchart for describing operation of an event server of FIG. 1, according to an exemplary embodiment.

FIG. 5 is a flowchart for describing operation of the event server 131 of FIG. 1, according to an exemplary embodiment. Referring to FIGS. 1 and 5, an operation of the event server 131 is as follows:

When metadata from one of the plurality of network cameras 11a through 11n is received by the event server 131 via the communication network 12 (operation S501), the event server 131 acquires event data by using the received metadata (operation S502).

When the subscriber 14, which requested a real-time event service, is connected to the subscriber management server 133 via the communication network 12 (operation S503, refer to operation S403 of FIG. 4A), the event server 131 transmits the event data acquired in operation S502 to the subscriber 14 (operation S504). The event server 131 stores the event data acquired in operation S502 (operation S505).

When storage error information from one the plurality of network cameras 11a through 11n is received by the event server 131 via the communication network 12 (operation S506, refer to operation S309 of FIG. 3A), the event server 131 outputs an alarm signal and the storage error information (operation S507). Therefore, an administrator of a surveillance system may check and repair or replace the non-volatile memory 206 of a corresponding one the plurality of network cameras 11a through 11n.

All of the above operations are repeatedly performed until a termination signal is generated (operation S508).

Figure 6:
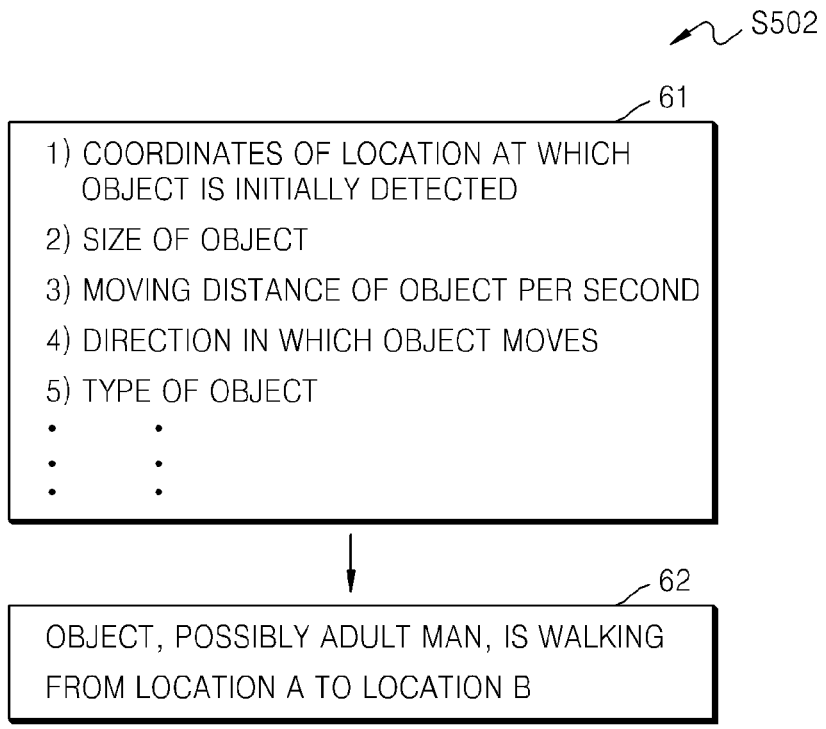
FIG. 6 is a diagram for describing examples of metadata and event data in FIG. 5, according to an exemplary embodiment.

FIG. 6 is a diagram for describing examples of metadata 61 and event data 62 described above including operation S502 of FIG. 5.

Referring to FIG. 6, as known in the art, the metadata 61, which is the basis of the event data 62 with respect to the network cameras 11a through 11n (see FIG. 1) may include information regarding coordinates of a location at which an object is initially detected, a size of the object, a moving distance of the object per second, a direction in which the object moves, and a type of the object, for example.

When the metadata 61 is transmitted from one the plurality of network cameras 11a through 11n to the event server 131 via the communication network 12, the event server 131 may generate the event data 62, which indicates "an object, possibly an adult man, is walking from a location A to a location B."

Figure 7:
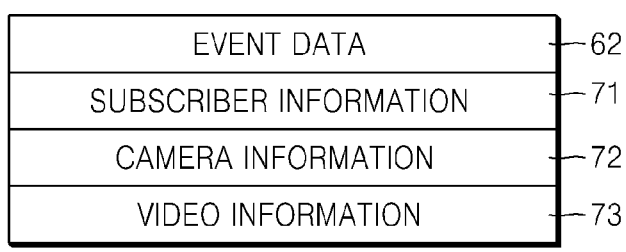
FIG. 7 is a diagram for describing how event data is stored in FIG. 5 according to an exemplary embodiment.

FIG. 7 is a diagram for describing how the event data 62 is stored in operation S505 of FIG. 5.

Referring to operation S505 of FIG. 5 and FIG. 7, when the event server 131 (see FIG. 1) stores the event data 62, the event data 62 is stored together with information 71 regarding subscribers which requested services related to the event data 62, information 72 regarding at least one camera, for example, at least one of the plurality of network cameras 11a through 11n, that transmitted metadata of the event data 62, and video information 73 indicating a location at which video corresponding to the metadata is stored.

Therefore, the search server 132 (see FIG. 1) may immediately receive video data by communicating with a corresponding at least one of the plurality of network cameras 11a through 11n (see FIG. 1) by searching for the subscriber-specific event data 62. Hereinafter, an operation of the search server 132, which operates according to subscriber information and service information (refer to FIGS. 4A and 4B) from the subscriber management server (133 of FIG. 1), is described with reference to FIGS. 8 through 13.

Figure 8:
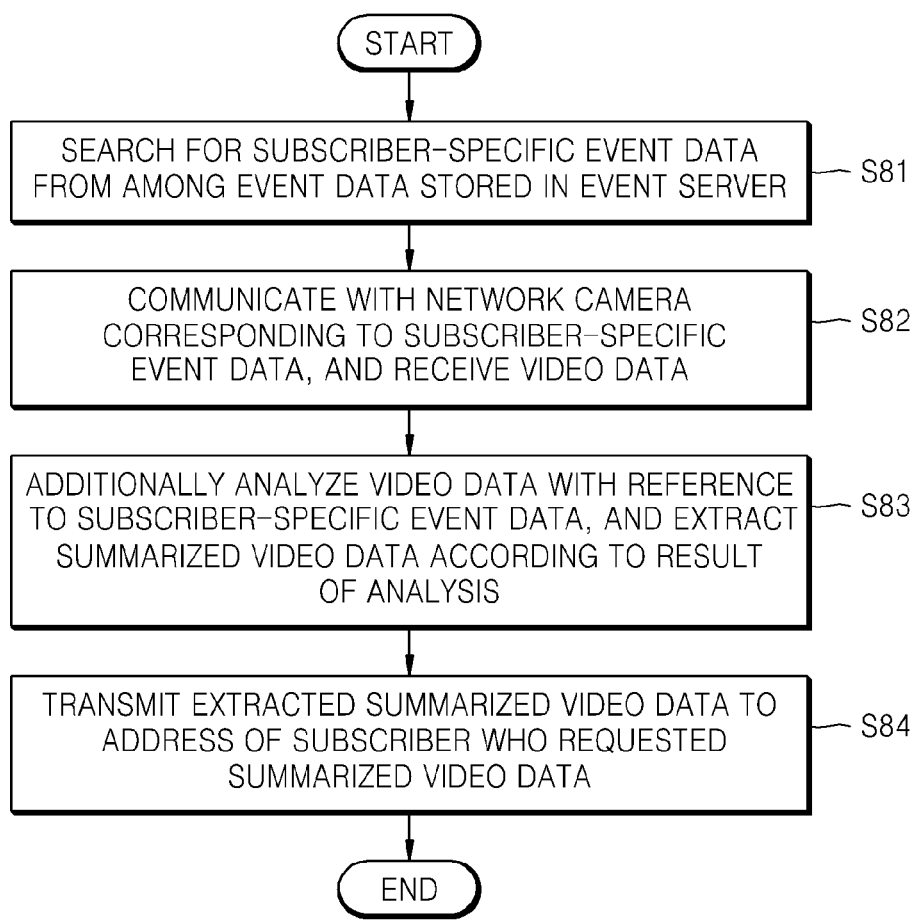
FIG. 8 is a flowchart for describing operation of a search server of FIG. 1 in a case where a summarized video service is requested to a subscriber management server in FIG. 4A, according to an exemplary embodiment.

FIG. 8 is a flowchart for describing operation of the search server 132 of FIG. 1 in a case where a summarized video service is requested from the subscriber management server 133 in operation S404 of FIG. 4A.

Referring to FIG. 1, operations S404 and S405 of FIG. 4A, and FIG. 8, when a subscriber, which requested a summarized video service, related to event data is connected (operation S404 of FIG. 4A), the subscriber management server 133 transmits subscriber information and service information to the search server 132 (operation S405 of FIG. 4A).

Therefore, the search server 132 searches for subscriber-specific event data from among event data stored in the event server 131 (operation S81).

Next, the search server 132 receives video data by communicating with at least one of the plurality of network cameras 11a through 11n (see FIG. 1) corresponding to the subscriber-specific event data (operation S82).

Next, the search server 132 additionally analyzes a video with reference to the subscriber-specific event data and extracts summarized video data according to a result of the analysis (operation S83). Examples of operation S83 will be described below with reference to FIGS. 9 and 10.

Next, the search server 132 transmits the extracted summarized video data to the requested subscriber (14 of FIG. 1) or an address that the requested subscriber designated (operation S84).

Figure 9:
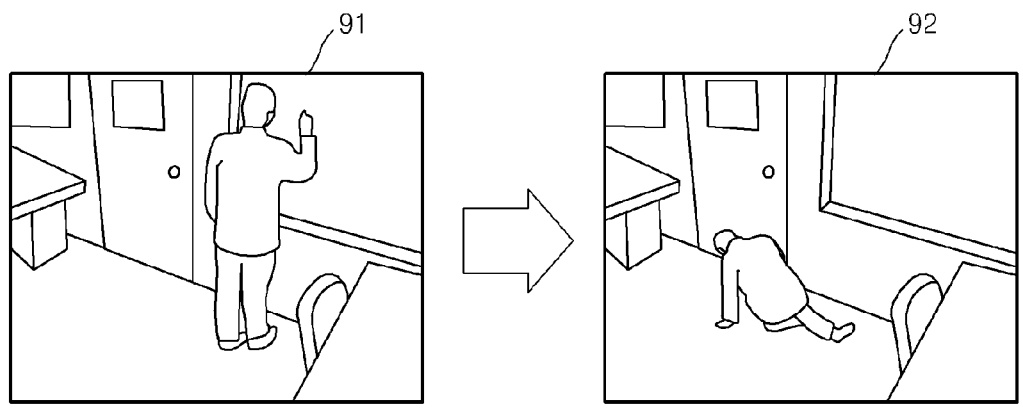
FIG. 9 is an image for describing an example of additional analysis in FIG. 8, according to an exemplary embodiment.

FIG. 9 is an image for describing an example of the additional analysis in operation S83 of FIG. 8. In FIG. 9, the reference numeral 91 denotes an example of event-related video, and the reference numeral 92 denotes an example of additionally analyzed video.

Referring to FIG. 9, event-related video 91 related to the subscriber-specific event data shows that a person appeared in a surveillance region of a corresponding one of the plurality of network cameras 11a through 11n, for example.

Here, the search server 132 additionally performs analysis on video corresponding to received data, and extracts scenes showing abnormal activities of the person, e.g., a scene showing that the person fell down, as an additionally analyzed video 92.

Here, the event-related video 91 and the additionally analyzed video 92 are all extracted as summarized video data.

FIG. 10 is an image for describing another example of the additional analysis in operation S83 of FIG. 8.

In FIG. 10, the reference numeral 101 denotes an example of event-related video, and the reference numeral 102 denotes an example of additionally analyzed video.

Referring to FIG. 10, the event-related video 101 related to subscriber-specific event data shows that a car passes a portion of a surveillance region of a corresponding one of the plurality of network cameras 11a through 11n, for example.

Here, the search server 132 additionally performs analysis on video corresponding to received data, and extracts scenes showing that the car was parked as the additionally analyzed video 102.

Here, the event-related video 101 and the additionally analyzed video 102 are all extracted as summarized video data.

Figure 11:
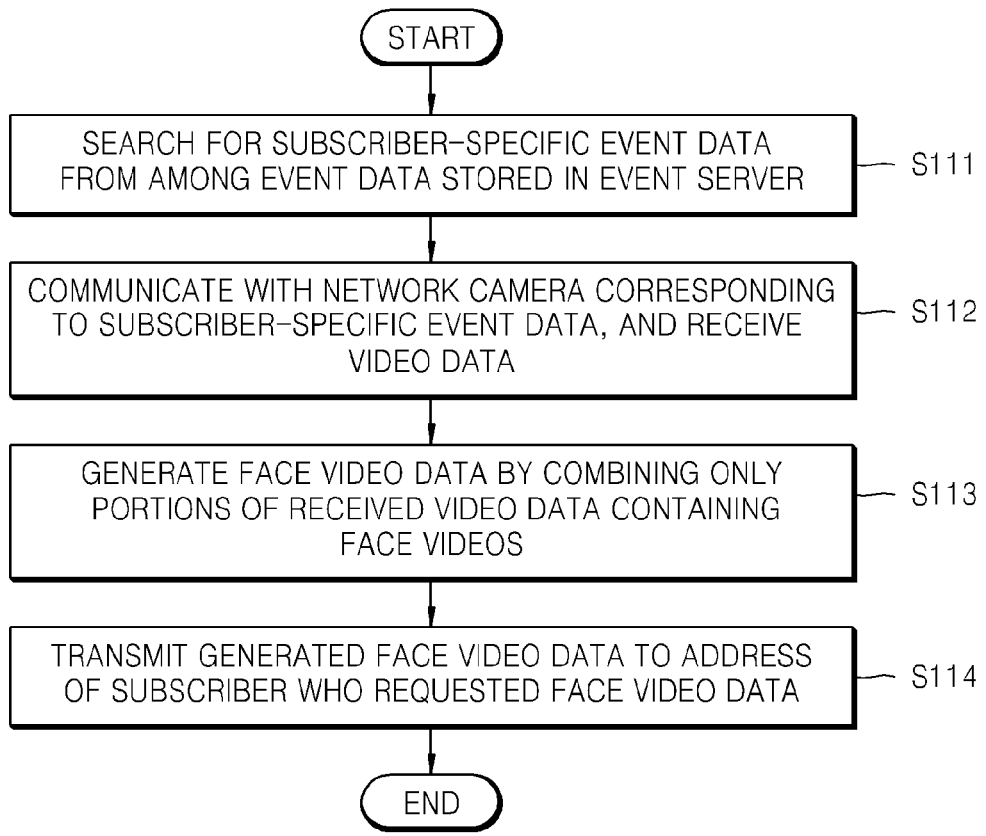
FIG. 11 is a flowchart for describing operation of the search server of FIG. 1 in a case where a face video service is requested to the subscriber management server in FIG. 4A, according to an exemplary embodiment.

FIG. 11 is a flowchart for describing operations of the search server 132 of FIG. 1 in a case where a face video service is requested from the subscriber management server 133 in operation S406 of FIG. 4A, according to an exemplary embodiment.

Referring to FIG. 1, operations S406 and S407 of FIG. 4A, and FIG. 8, when a subscriber 14, which requested a face video service related to event data, is connected (operation S406 of FIG. 4A), the subscriber management server 133 transmits subscriber information and service information to the search server 132 (operation S407 of FIG. 4A).

Therefore, the search server 132 searches for subscriber-specific event data from among event data stored in the event server 131 (operation S111).

The search server 132 receives video data by communicating with at least one of the plurality of network cameras 11a through 11n (see FIG. 1) corresponding to the subscriber-specific event data (operation S112).

The search server 132 generates face video data by combining only portions of the received video data containing face videos (operation S113).

The search server 132 transmits the generated face video data to the requested subscriber or an address that the requested subscriber 14 designated (see FIG. 1) (operation S114).

Figure 12:
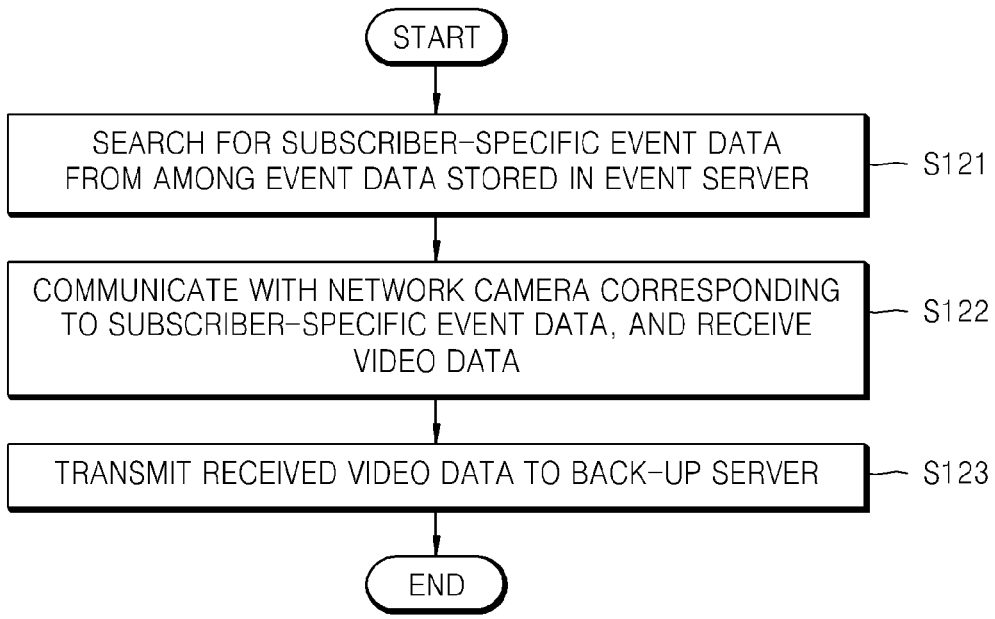
FIG. 12 is a flowchart for describing operation of the search server of FIG. 1 in a case where a video back-up service is requested to the subscriber management server in FIG. 4A, according to an exemplary embodiment.

FIG. 12 is a flowchart for describing operations of the search server 132 of FIG. 1 in a case where a video back-up service is requested from the subscriber management server 133 in operation S408 of FIG. 4B, according to an exemplary embodiment.

Referring to FIG. 1, operations S408 and S409 of FIG. 4B, and FIG. 8, when a subscriber 14, which requested a video back-up service related to event data, is connected (operation S408 of FIG. 4B), the subscriber management server 133 transmits subscriber information and service information to the search server 132 (operation S409 of FIG. 4B).

The search server 132 searches for subscriber-specific event data from among event data stored in the event server 131 (operation S121).

The search server 132 receives video data by communicating with at least one of the plurality of network cameras 11a through 11n (see FIG. 1) corresponding to the subscriber-specific event data (operation S122).

The search server 132 transmits the received video data to the back-up server 134 (see FIG. 1) (operation S123).

Figure 13:
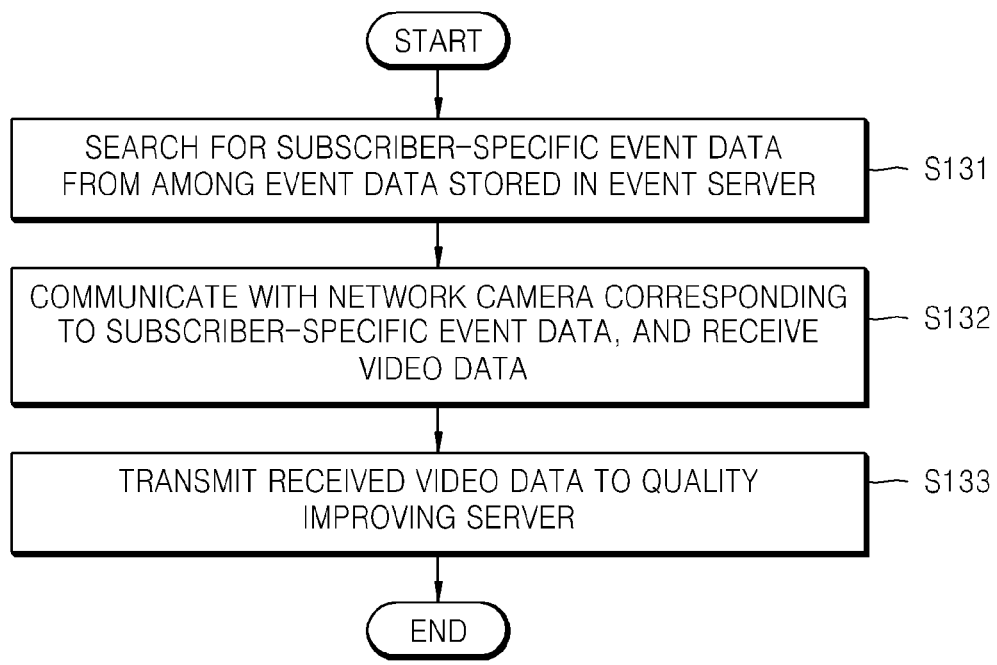
FIG. 13 is a flowchart for describing operation of the search server of FIG. 1 in a case where a quality improvement service is requested to the subscriber management server in FIG. 4B, according to an exemplary embodiment.

FIG. 13 is a flowchart for describing operations of the search server 132 of FIG. 1 in a case where a quality improvement service is requested from the subscriber management server 133 in operation S410 of FIG. 4B, according to an exemplary embodiment.

Referring to FIG. 1, operations S410 and S411 of FIG. 4B, and FIG. 8, when a subscriber 14, which requested a quality improvement service related to event data, is connected (operation S410 of FIG. 4B), the subscriber management server 133 transmits subscriber information and service information to the search server 132 (operation S411 of FIG. 4B).

The search server 132 searches for subscriber-specific event data from among event data stored in the event server 131 (operation S131).

The search server 132 receives video data by communicating with at least one of the plurality of network cameras 11a through 11n (see FIG. 1) corresponding to the subscriber-specific event data (operation S132).

The search server 132 transmits the received video data to the quality improving server 134 (see FIG. 1) (operation S133).

As described above, according to exemplary embodiments, each of network camera stores captured video data, extracts metadata, which is the basis of event data, from the video data, transmits the metadata to a server, and, if requested by the server, transmits the stored video data to the server.

Therefore, it all of the network cameras need to transmit video data to the server.

Therefore, if a large number of network cameras are required or higher quality video is required, an amount of data to be transmitted to the server may be significantly reduced. As a result, the following effects as follows may be expected:

First, communication errors during data transmission may be significantly reduced, and thus, the reliability of a surveillance function may be improved.

Second, since event data, which is significantly smaller than video data, is stored in a server, event data corresponding to a particular channel may be quickly searched for according to a user request, and a related video may be quickly received from at least one of the network cameras corresponding to the searched event data.

Third, due to the first and second effects, that is, high reliability of a surveillance function and a relatively short period of time for searching for video of a particular channel, various services related to a surveillance function may be provided to subscribers.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A surveillance system comprising:
a plurality of network cameras; and
at least one server connected to the network cameras via a communication network, wherein each of the network cameras captures and stores video data, extracts metadata, which is a basis of event data, from the video data, transmits the metadata to the server, wherein, if requested by the server, each of the network cameras transmits the stored video data to the server, wherein the server comprises:

a subscriber management server which manages subscriber information about a subscriber, and provides a service requested by the subscriber to the subscriber;

an event server which acquires event data by using the metadata received from the network cameras and stores the event data; and a search server which searches for subscriber-specific event data in the event data stored in the event server according to at least one of the subscriber information and service information from the subscriber management server, and receives video data by communicating with at least one of the network cameras corresponding to the subscriber-specific event data, and wherein each of the network cameras comprises:

an optical component;

a photoelectric converter which converts light incident via the optical component to electric signals;

a signal processor which generates the video data by processing the electric signals from the photoelectric converter;

a controller which receives the video data from the signal processor and controls the network camera;

a metadata extractor which extracts the metadata from the video data from the controller and inputs the metadata to the controller;

a video data compressor which compresses the video data from the controller and inputs the compressed video data to the controller;

a non-volatile memory which stores programs for operating the controller and the compressed video data from the controller;

a volatile memory which loads the programs for operating the controller and buffers the compressed video data from the controller; and a communication interface which supports communication between the controller and the event server and communication between the controller and the search server.

2. The surveillance system of claim 1, wherein, after the compressed video data is stored in the non-volatile memory, the controller determines whether there is a storage error by reading the stored compressed video data, and wherein, if it is determined that the storage error occurs, the controller transmits storage error information to the event server.

3. A surveillance system comprising:

a plurality of network cameras; and at least one server connected to the network cameras via a communication network, wherein each of the network cameras captures and stores video data, extracts metadata, which is a basis of event data, from the video data, transmits the metadata to the server, wherein, if requested by the server, each of the network cameras transmits the stored video data to the server, wherein the server comprises:

a subscriber management server which manages subscriber information about a subscriber, and provides a service requested by the subscriber to the subscriber;

an event server which acquires event data by using the metadata received from the network cameras and stores the event data;

a search server which searches for subscriber-specific event data in the event data stored in the event server according to at least one of the subscriber information and service information from the subscriber management server, and receives video data by communicating with at least one of the network cameras corresponding to the subscriber-specific event data;

a quality improving server which processes the video data received from the search server to improve video quality; and a back-up server which stores a backup of the video data received from the search server.

4. The surveillance system of claim 3, wherein, if the subscriber requests a video back-up service related to the event data, the subscriber management server transmits the at least one of the subscriber information and the service information to the search server, and the search server:

searches for the subscriber-specific event data from among the event data stored in the event server;

receives the video data by communicating with the at least one of the plurality of network cameras corresponding to the subscriber-specific event data; and transmits the received video data to the back-up server.

5. The surveillance system of claim 3, wherein, if the subscriber requests a quality improvement service related to the event data, the subscriber management server transmits the at least one of the subscriber information and the service information to the search server, and the search server:

searches for the subscriber-specific event data from among the event data stored in the event server;

receives the video data by communicating with the at least one of the plurality of network cameras corresponding to the subscriber-specific event data; and transmits the received video data to the quality improving server.

\* \* \* \* \*